July 9, 1935. G. A. RUTKOSKIE ET AL Re. 19,642

PRINTING PRESS FOR PRODUCING WAX CARBON SPOTS ON SHEETS OF PAPER

Original Filed Jan. 18, 1933 10 Sheets-Sheet 1

INVENTORS
George A. Rutkoskie
BY Nelson J. Welk
Harry Lee Dodson
ATTORNEY

PRINTING PRESS FOR PRODUCING WAX CARBON SPOTS ON SHEETS OF PAPER

Original Filed Jan. 18, 1933 10 Sheets-Sheet 2

INVENTORS
George A. Rutkoskie
BY Nelson S. Welk
Harry Lee Dodson
ATTORNEY

PRINTING PRESS FOR PRODUCING WAX CARBON SPOTS ON SHEETS OF PAPER

Original Filed Jan. 18, 1933 10 Sheets-Sheet 3

INVENTORS
George A. Rutkoskie
BY Nelson S. Melk
Harry Lee Dodson
ATTORNEY

PRINTING PRESS FOR PRODUCING WAX CARBON SPOTS ON SHEETS OF PAPER

Original Filed Jan. 18, 1933 10 Sheets-Sheet 4

INVENTORS
George A. Rutkoskie
BY Nelson S. Meek
Harry Leo Ostrom
ATTORNEY

PRINTING PRESS FOR PRODUCING WAX CARBON SPOTS ON SHEETS OF PAPER

Original Filed Jan. 18, 1933 10 Sheets-Sheet 5

INVENTORS
George A. Rutkoskie
BY Nelson S. Melk
Harry Lee Dodson
ATTORNEY

PRINTING PRESS FOR PRODUCING WAX CARBON SPOTS ON SHEETS OF PAPER

Original Filed Jan. 18, 1933 10 Sheets-Sheet 6

INVENTORS
George A. Rutkoskie
BY Nelson S. Melk
Harvey Lee Dodson
ATTORNEY

PRINTING PRESS FOR PRODUCING WAX CARBON SPOTS ON SHEETS OF PAPER

Original Filed Jan. 18, 1933 10 Sheets-Sheet 7

INVENTORS
George A. Rutkoskie
BY Nelson S. Melk
Harry Lee Dodson
ATTORNEY

PRINTING PRESS FOR PRODUCING WAX CARBON SPOTS ON SHEETS OF PAPER

Original Filed Jan. 18, 1933 10 Sheets-Sheet 8

INVENTORS
George A. Rutkoskie
BY Nelson S. Melk
Harvey Lee Dodson
ATTORNEY

PRINTING PRESS FOR PRODUCING WAX CARBON SPOTS ON SHEETS OF PAPER

Original Filed Jan. 18, 1933 10 Sheets-Sheet 9

INVENTORS
George A. Rutkoskie
BY Nelson S. Melk
Harry Lee Dodson
ATTORNEY

PRINTING PRESS FOR PRODUCING WAX CARBON SPOTS ON SHEETS OF PAPER

Original Filed Jan. 18, 1933 10 Sheets-Sheet 10

INVENTORS
George A. Rutkoskie
BY Nelson S. Melk
Harvey Lea Dodson
ATTORNEY

Reissued July 9, 1935 Re. 19,642

UNITED STATES PATENT OFFICE 19,642

PRINTING PRESS FOR PRODUCING WAX CARBON SPOTS ON SHEETS OF PAPER

George A. Rutkoskie and Nelson S. Welk, Athens, Ohio, assignors to The McBee Company, Athens, Ohio, a corporation of Ohio Original No. 1,961,829, dated June 5, 1934, Serial No. 652,284, January 18, 1933. Application for reissue May 29, 1935, Serial No. 24,516

25 Claims. (Cl. 101—357)

Our invention relates to presses of the class which are described in Patent No. 1,860,957, issued to George A. Rutkoskie, May 31, 1932, and has for its object to improve the apparatus for handling the carbon, the means employed for driving the rollers, the apparatus heating the rollers and the means of controlling the temperature of the rollers. As explained in that patent the device is mounted upon a Kelly press and as the Kelly press is a well known article of commerce, we shall not describe all of the parts thereof, but the description will be confined to the new features produced by us and which constitute additions to the press as manufactured by the Kelly Press Company.

As stated in the said patent, it has been found that, owing to the lack of tack in the melted wax carbon, the rollers must be positively driven at the time that they contact or it is impossible to secure a satisfactory spot carbon upon the paper. It has been found in practice that when the rollers are rotated in the manner provided by the drive of the Kelly press, the centrifugal effect causes considerable of the wax carbon to be thrown off on to other parts of the press and on to the heating elements entailing considerable cleaning work. An object of our invention is to provide means to overcome this objectionable feature.

It has been found in practice that if the direction of rotation of the ink fountain roller is reversed there is less likelihood of it throwing off any of the wax carbon. To obtain this result we reverse the drive for the inking mechanism. We do this by reversing the position of the cam shaft driving pinion upon its shaft and shifting its position on the shaft, so that it meshes with the teeth of the cam shaft bevel gear on the opposite side of the bevel gear. We also change the timing of the inking mechanism by shifting both the ink fountain roller cam and the ductor roller cam 189 on the cam shaft. The result is to bring the ductor roller in contact with the ink fountain roller when the surface presented to the ductor roller is moving in a downward direction and also to time the period of rotation of the ink fountain roller so that it is rotating when the ductor roller touches it. This change in the timing of the ductor roller causes it to contact the vibrator roller when the surface of the vibrating roller presented to the ductor roller is moving in an upward direction. In order to do this it became necessary to mount the ink fountain upside down and to make special brackets to hold it in the new position.

Another object of our invention is to provide means for obtaining a more uniform temperature for the rollers than can be done where the heating elements are mounted adjacent the rollers.

It has also been found that by locating the heating elements inside of the rollers that a more uniform temperature can be obtained with more efficient results. Obviously mounting the elements in the rollers necessitates the provision of means for conveying current to the elements while they are being rotated. This was done by mounting collector rings on one end of the shaft which carry the elements and providing brushes to convey current thereto.

A further object of the invention is the provision of means to render it impossible for there to be any cessation of rotation on the part of the vibrator, ductor and ink fountain rollers at the time of their contact for it has also been found that the utilization of toothed gears for the rotation of the ductor roller by means of such gears on the vibrator and ink fountain roller will under certain circumstances, permit a slight cessation of rotation. We have found in practice that this can be entirely overcome by the provision of friction gears in the place of spur gears.

A further object of our invention is to provide means whereby it is possible to agitate the contents of the ink fountain and it has also been found desirable to provide manually operated means to agitate the contents of the ink fountain.

A further object of our invention is to provide improved adjustments for the ink fountain blade for in the new method of handling the wax carbon it has been found in practice that it is necessary to provide adjusting screws at very close intervals for the adjustment of the ink fountain blade, in order to secure a sufficiently fine adjustment to obtain a sharp edge for the strip of wax carbon compound.

A further object of our invention is to provide a construction which will prevent the deposit of wax from the ink plate for it has also been found in practice that it is necessary to provide for the exclusion of the wax from various parts of the machine and we have been obliged to place blocks in the corners of the bed plate to keep the wax from dripping down from the ink plate.

A further object of our invention is to provide means to render the electrical control much more sensitive for it has also been found that the thermo-couple will not act with sufficient frequency to maintain uniform temperature, i. e. it is slow to respond with the result that the rollers reach too high a temperature before the current is cut off and then when it is cut off, the temperature drops too much before the current is again cut in. This necessitates the provision of means which are extremely sensitive for the purpose of controlling this heat. We have found by locating an element exterior to the elements in the rolls or other parts of the machine and placing a liquid heat responsive element in juxtaposition thereto that by regulating the spacing of the liquid heat responsive element from the element a very extreme degree of sensitiveness in control is obtainable and the rollers can be maintained at almost exactly uniform temperature. This is of the utmost importance for the reason that if the heat is too great the wax will crystallize and will not be operative. If it is too cold it will not carry on the rollers at all. In the patent referred to, the lock-up base has the heating elements located in it.

A further object of the invention is to provide a construction by means of which the heating elements may be located in the bed plate instead of the lock-up base for we have found in practice that by locating the elements in the bed plate of the press that considerable loss of time is avoided in setting up the press for another job.

Our means of accomplishing the foregoing objects may be more readily understood by having reference to the accompanying drawings which are hereunto annexed and made a part hereof, in which—

Similar reference numerals refer to similar parts throughout the entire description.

Figure 8:
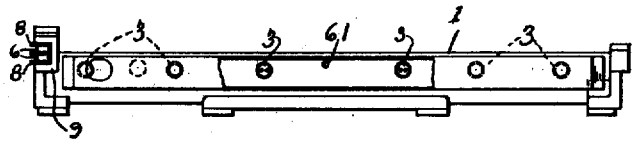
Fig. 8 is a view of the front end of the bed plate.
Figure 9:
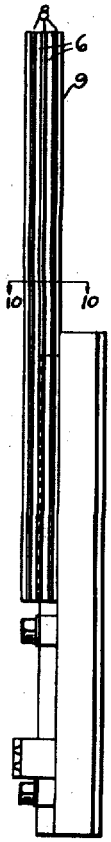
Fig. 9 is a side view.
Figure 7:
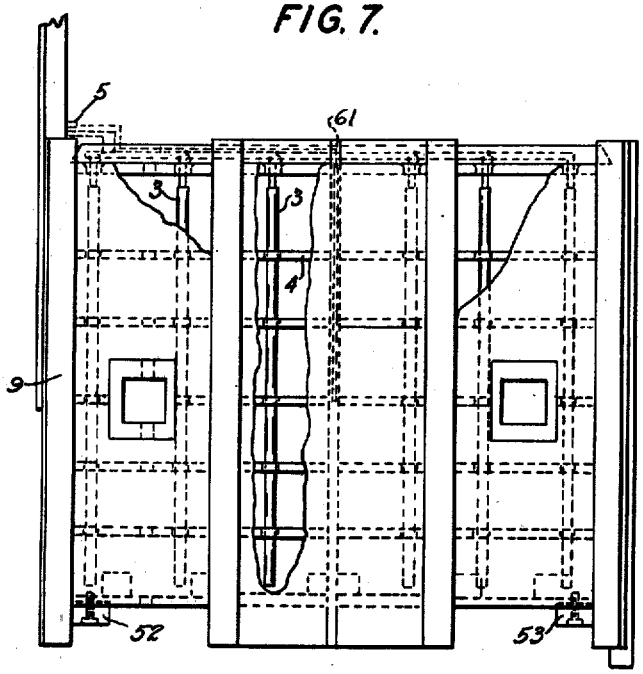
Fig. 7 is a bottom view of the bed plate partly broken away to show the manner of mounting the heating elements therein.
Figure 10:
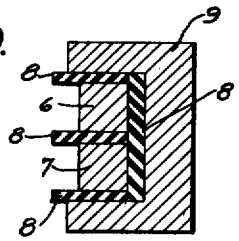
Fig. 10 is an enlarged sectional view of the sliding contacts on line 10—10 in Fig. 9.
Figure 11:
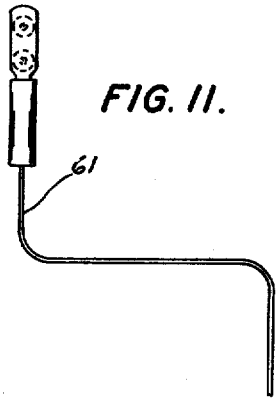
Fig. 11 is a detail view of the thermo-couple.

As shown in the drawings, the type bed or bed plate 1 of the machine may have mounted thereon the usual lock-up base. The bed plate 1 is heated by a number of electric heating elements 3 clearly seen in Fig. 7. They are mounted in sleeves which are inserted in apertures cast or drilled in the ribs 4 on the inside of the bed plate 1, as clearly seen in Figs. 7 and 8. This construction makes it possible to change one of the elements by merely disconnecting the wires at their extremities and drawing them out of the supporting ribs 4. Obviously this can be done without tearing down the machine at all. The wires lead to brushes 5 which engage contacts 6 and 7 mounted in suitable insulation 8 and carried by a channel 9. As clearly seen in the drawings the channel 9 extends completely over the contacts 6 and 7 so that they are amply protected from any excess or surplus carbon. The ink plate 10 is also heated by an electric element 11 which may also be connected to the sliding contacts 6 and 7. The carbon is placed in an ink fountain 12, the bottom of which is provided with two heating elements 13 and 14.

A liquid heat responsive element 15 is mounted intermediate these heaters for the purpose of controlling the temperatures of the ink fountain 12. Inside of the ink fountain we mount an agitating device which comprises a rod 16 and a paddle 17, the rod extending through the end wall 18 of the ink fountain 12 providing for manual operation of the agitating device as it has been found in practice that it is highly important that even though melted it is essential to the most satisfactory operation of the machine that the melted carbon be agitated at intermittent periods.

The upper part of the ink fountain is closed by a cover 19 in which is mounted the ink fountain blade 20. We have found it essential for the adjustment of this blade to provide a multiplicity of adjusting screws 21 at closely spaced intervals in an upwardly extending portion 22 of the cover 19 as it is quite impossible to secure the necessary adjustment of the ink fountain blade otherwise, as shown. An electric heating element 23 is preferably mounted on the upwardly extending portion 22. It need not be so mounted nor need the elements 13 and 14 be located precisely as illustrated. They need only be adjacent the ink fountain and so located as to maintain the desired temperature of the wax carbon in the ink fountain.

The melted compound in the ink fountain 12 is carried by the ink fountain roller 24 to the ductor roller 25 whence it passes to the oscillating or vibrator roller 26 which is preferably formed of a special composition which will withstand approximately a temperature of 200° F. The melted composition is distributed from the vibrator or oscillating roller 26 to the distributing roller 27 and thence to the form roller 28. We have found it necessary to provide a special construction for the ink roller 24 and the vibrating roller 26 and in some cases this special construction may also be used for the form roller 28 though in the drawings we have not shown it for this roller.

Figure 1:
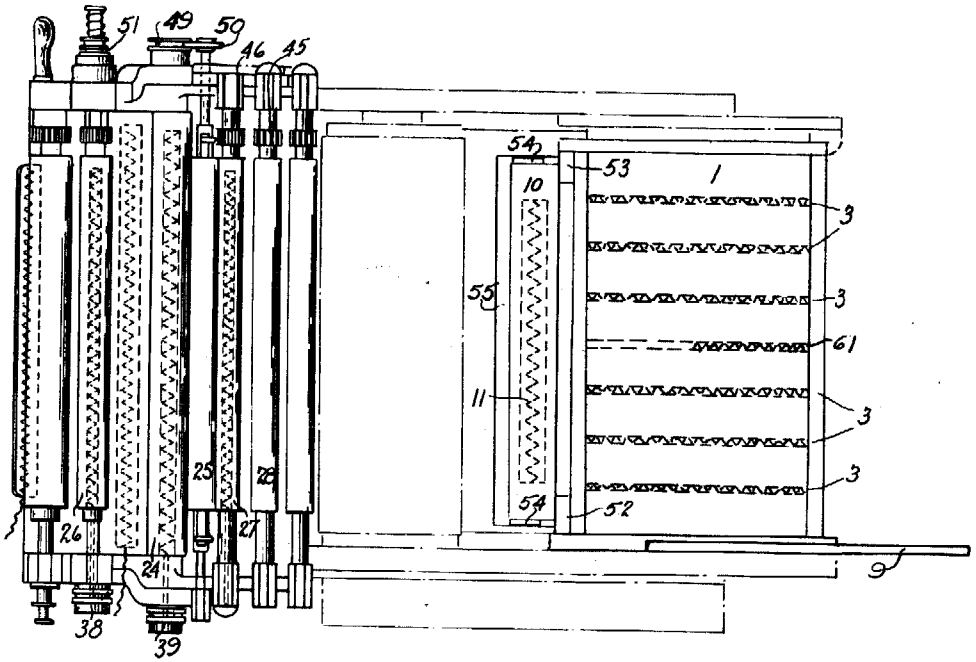
Fig. 1 is a top or plan view of our invention applied to an ordinary automatic feed printing press.
Figure 2:
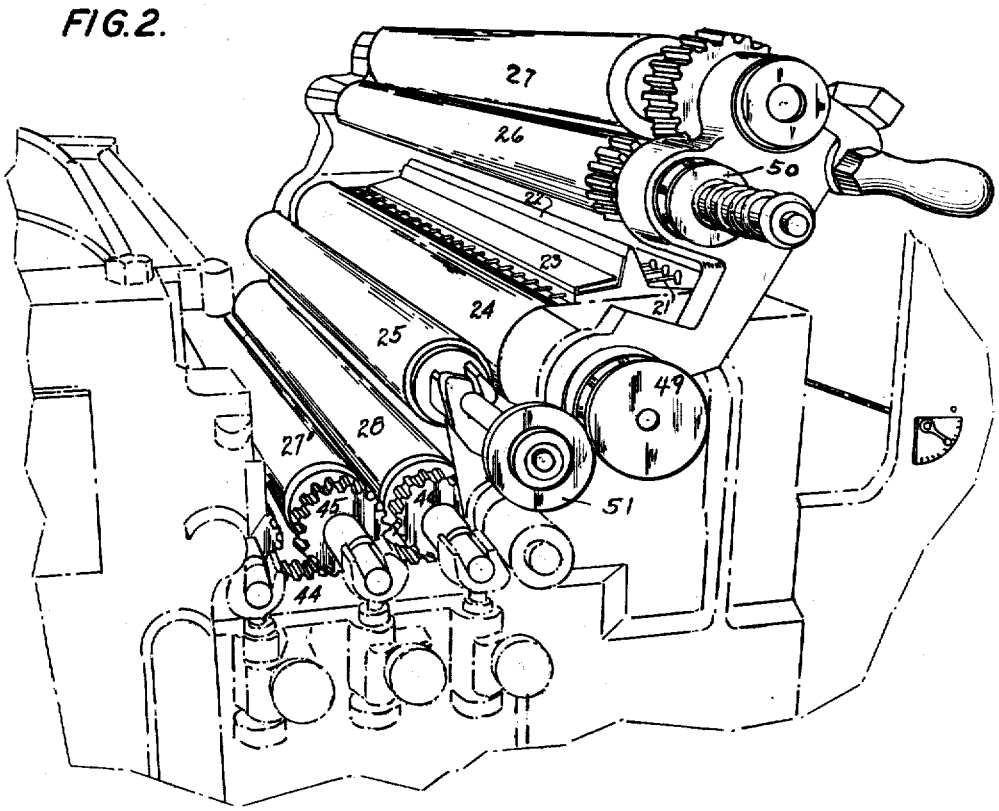
Fig. 2 is a perspective view showing the rollers, opened.
Figure 16:
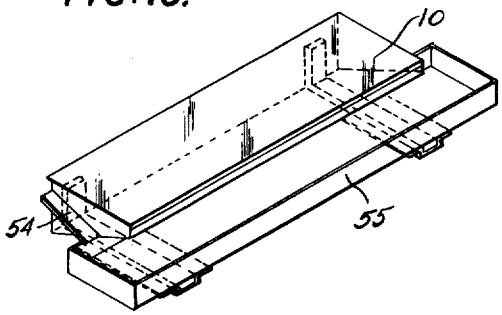
Fig. 16 is a detail view of the ink plate assembly showing the drip pan and gutters for directing excess carbon into the drip pan.
Figure 3:
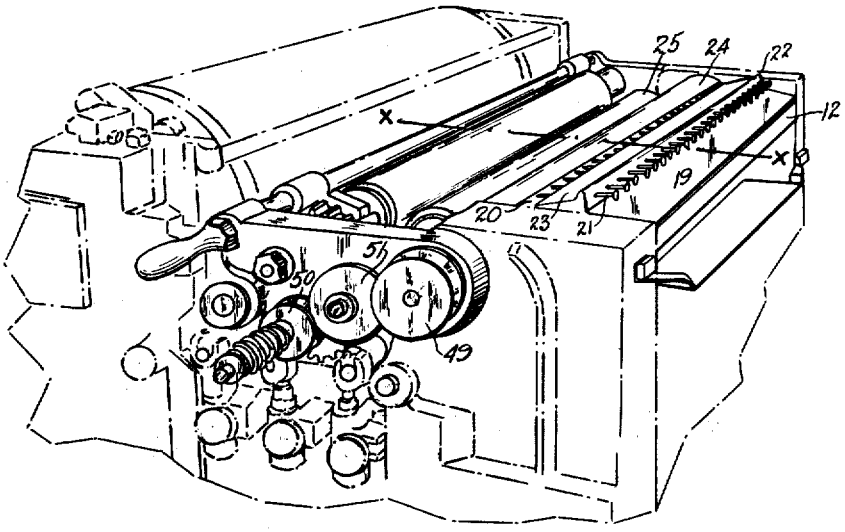
Fig. 3 is a perspective view with the rollers in position.
Figure 4:
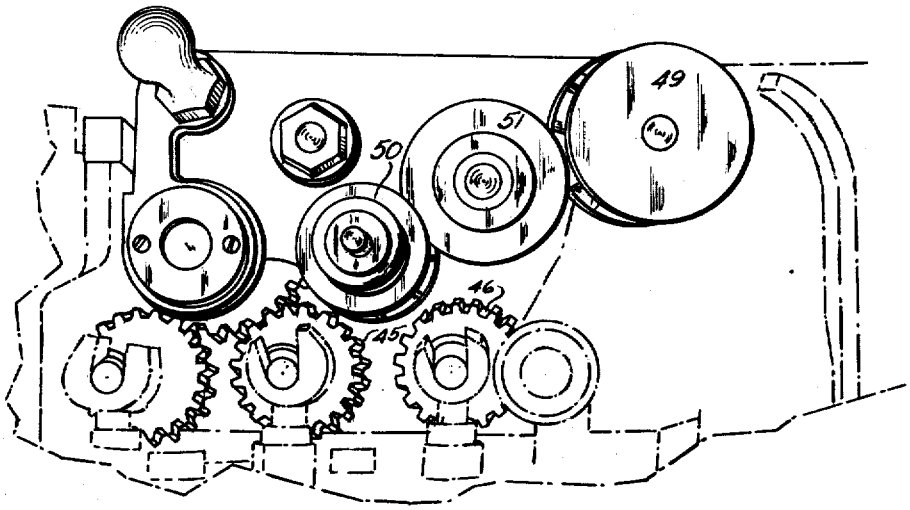
Fig. 4 is a view showing the gear side of the press showing the friction gear on the vibrator roller in contact with the friction gear on the ductor roller.
Figure 5:
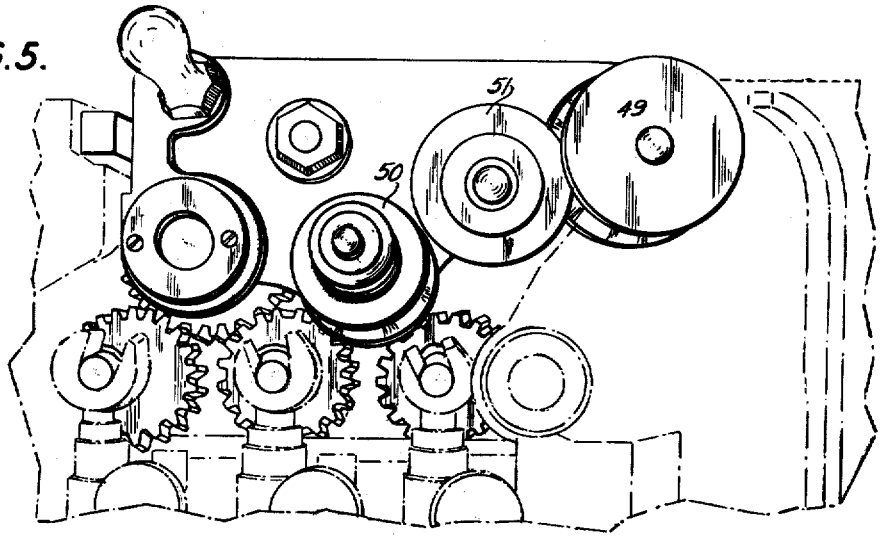
Fig. 5 is a similar view showing the friction gear on the ductor roller in contact with the friction gear on the ink fountain roller.
Figure 6:
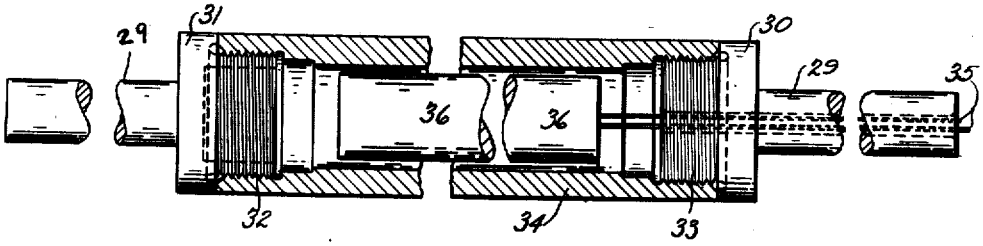
Fig. 6 is an enlarged view partly in section showing our manner of mounting the heating elements in the rollers.

This special construction is more clearly seen by having reference to Fig. 6 in which the roller is mounted upon shafts 29 which carry two collars 30 and 31. These collars have inwardly extending threaded hubs 32 and 33 which are screwed into a cylinder 34. A hole is formed in one of the shafts 29 through which the electric conductors 35 pass to the heating element 36 which is mounted inside of the cylinder 34. It will be apparent from an inspection of Fig. 6 that it is a comparatively simple matter in case it becomes necessary to renew the heating element 36 to unscrew one of the collars and quick and convenient access to the heating elements is thus had. Below the ductor roller 25 we mount a liquid heat responsive element 37 to control the temperature of the rollers. The rotating heating elements are supplied with current through the medium of collector rings 38 and 39 mounted upon the shafts which carry rollers 24 and 26. In some cases it may be found desirable to mount a heating element 95 adjacent the fixed or form roller 28. The collector ring 38 is engaged by brushes 40 which are held against the segments by means of springs (not shown) in the usual or standard construction. The brushes are connected by means of electric conductors 41 to a suitable source of electrical supply (not shown). A similar set of brushes 42 are provided for the collector ring 39, electrical conductors 43 serving to convey current thereto; the brushes 40 are mounted upon a block 90 which is secured to the arm 91 by means of a bolt 92, this arm 91 being the standard equipment of the press for reciprocating the oscillating or vibrator roller.

As is well known the form rollers 27' and 28 are driven by a reciprocating rack 44, the teeth of which engage the gear 45 which meshes with the gear on the shaft of the distributing roller 27 which in turn meshes with the gear 46 mounted on the shaft of the roller 28.

As hereinbefore set forth, it has been found that there is no tack in the melted carbon. It is therefore absolutely essential that the rollers be rotating at the time of contact. The ink fountain roller 24 is intermittently rotated through the medium of the ratchet wheel 47 and the pawl 48 which is operated by the standard mechanism furnished on the press for this purpose. It is well known, however, that the ductor roller depends upon the tack in the ink to rotate it when it is brought into contact with the ink fountain roller. We overcome this lack of tack by changing the timing of the ductor roller to the time of rotation of the ink fountain roller so that the ink fountain roller preferably will be rotating at the time the ductor roller contacts it and then by mounting a friction gear 49 at the end of the shaft carrying the ink fountain roller 24, this gear coming in contact with the gear 51 mounted on the end of the shaft carrying the ductor roller 25 operates to cause it to be rotated when the two rollers are brought in contact. The ductor roller then travels from the ink fountain roller to the oscillating or vibrator roller 26. On the shaft of this vibrator roller 26 we mount a friction gear 50 as this vibrator roller 26 is rotated first in one direction and then in the other by the spur gears which are actuated by the reciprocation of rack 44 on the press. It is obvious that contact of the friction gears 50 and 51 will bring about rotation of the ductor roller 25 so that there will be no difficulty in transferring the melted carbon from one roller to another. In the patent to Rutkoskie, hereinbefore referred to, he brings about this rotation by means of spur gears. The teeth of the gear on the ductor roller are pointed so that it will be impossible for them to engage the top of the gears on either the ink fountain roller or the oscillating roller. We have found in practice, however, that a perfect form of gear for this purpose is a friction gear. We, therefore, form the gears 49 and 50 with V-shaped peripheral grooves which are adapted to receive the friction gear 51 mounted on the shaft of the ductor roller.

Figure 18:
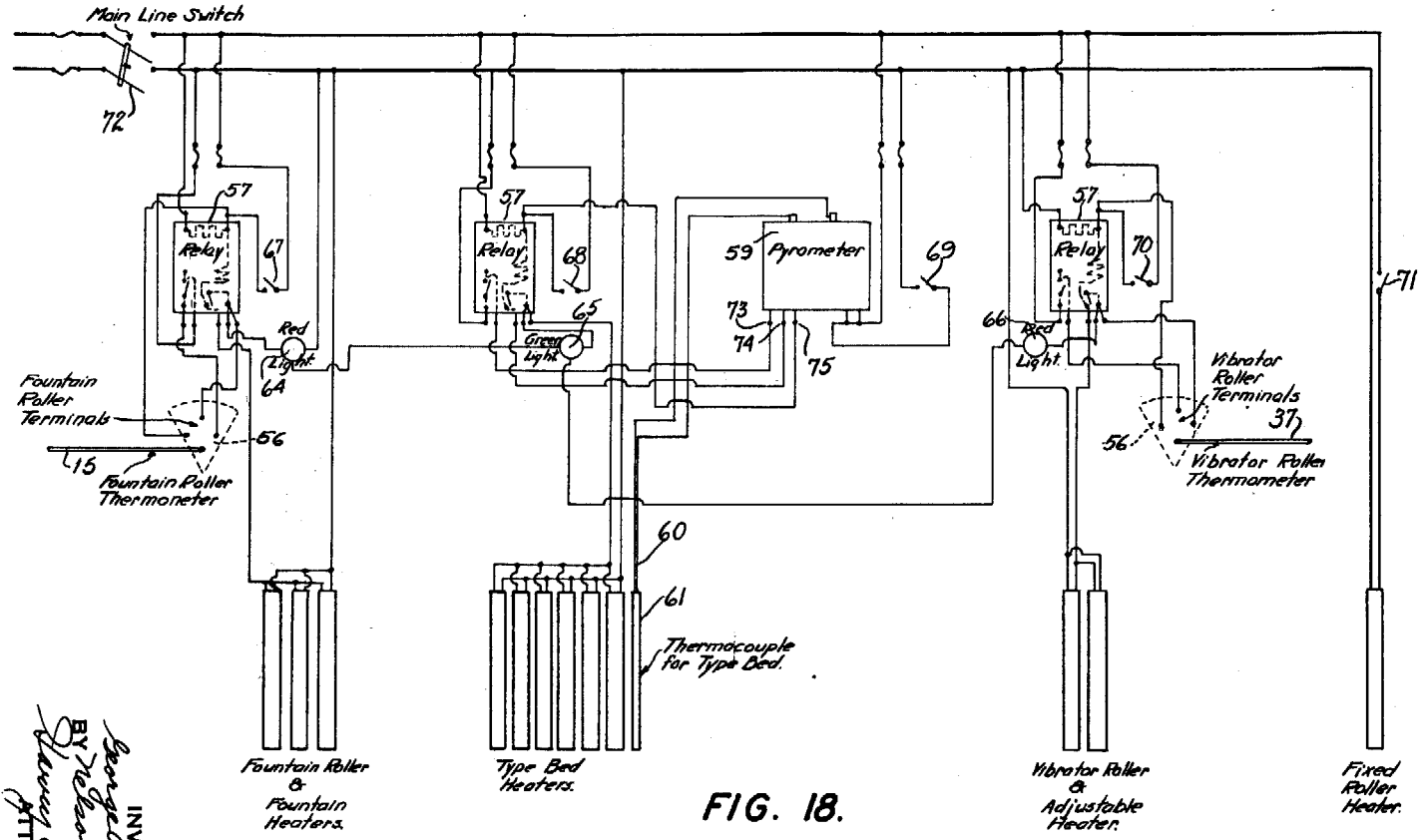
Fig. 18 is a wiring diagram.
Figure 19:
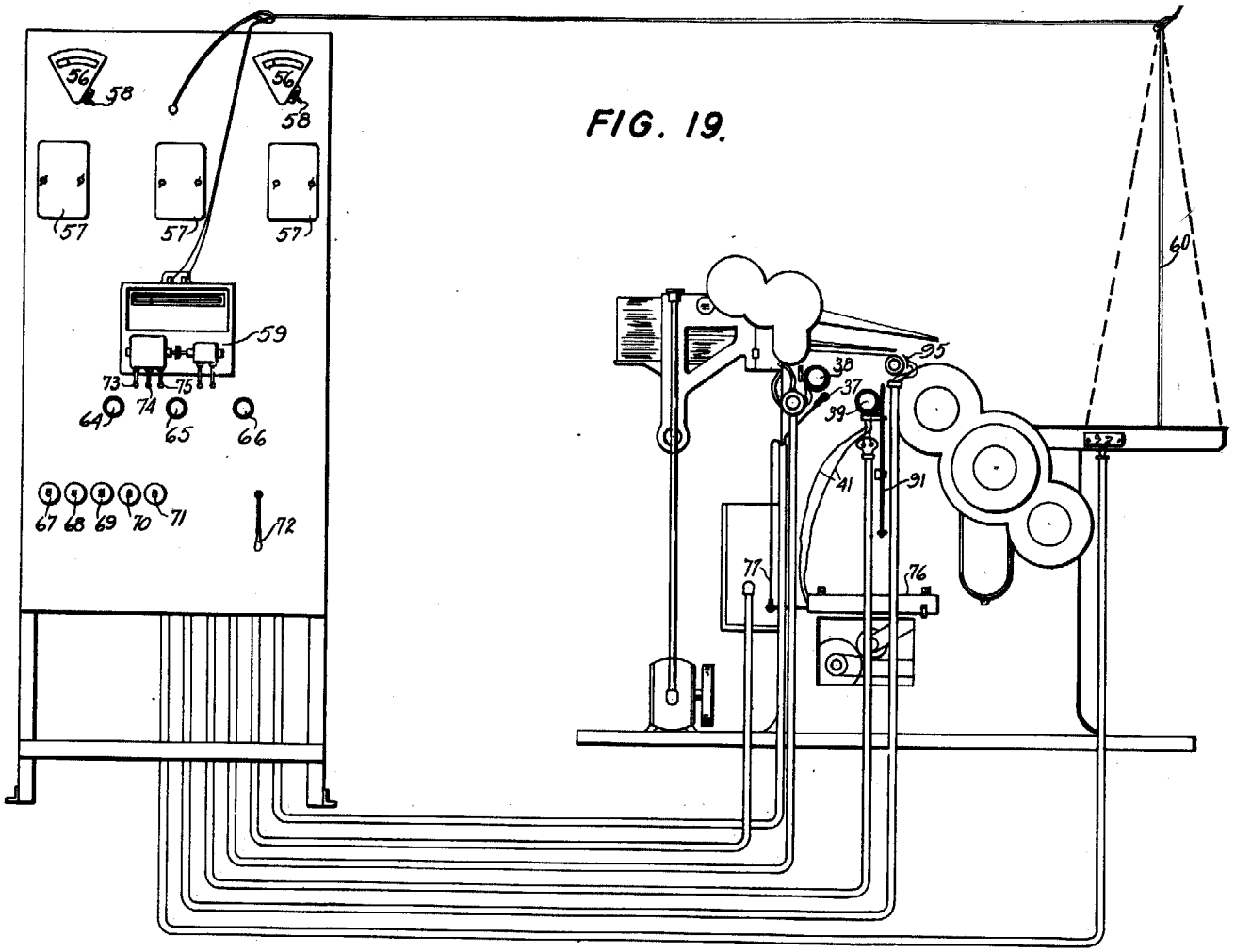
Fig. 19 is a diagrammatic view of the back of the switch board, the machine being shown in more or less diagrammatic manner.

In the usual construction of a bed plate and ink plate, openings are to be found at the corners of the bed plate adjacent the ink plate 10. We have found it necessary to insert blocks 52 and 53 in these spaces which serve to prevent any surplus carbon from getting down into the operating parts of the machine. At each end of the ink plate 12 we mount gutters 54 which lead to a drip pan 55 placed below and behind the ink plate 10. This receives and effectually prevents any of the surplus carbon reaching any of the operating mechanism of the machine. In the wiring diagram, Fig. 18, liquid heat responsive elements 15 and 37 which consist of a hollow bulb and a tube filled with liquid are mounted adjacent the ink fountain 12 and the oscillating or vibrator roller 26. The bulbs are thus placed where the heat is to be controlled; as the heat increases it causes the liquid in the bulb to expand, thus exerting the pressure on the thermometer controller 56 shown in Fig. 19. This pressure opens the relay circuit in the thermometer controller. When this circuit is opened it opens coils in the relay switch 57. The purpose of this coil is to hold the contact closed on the load circuit. This circuit leads to whatever part of the press that this particular bulb controls the heat in. A small lever 58 at the base of the liquid heat responsive element controller 56 can be moved backwards or forward for lowering or increasing the heat. If moved to the left the liquid in the tube must go to a higher degree in order to exert enough pressure to break the contact. In order for the pressure to go to a high degree the elements are in contact longer. This holds the heat high adjacent the bulb. Moving the lever 58 in the opposite direction, of course, lowers the heat. There is no electric contact at any time with the liquid heat responsive element. The pyrometer 59 is in no way connected with the rest of the machine. It operates with and controls only the heat on the type bed. Practice has found it impossible to control this with a relay and bulb, for the reason that it would be necessary for the tube of the liquid heat responsive element to swing back and forth with the type bed. This reciprocation would break the glass containing the heat responsive element in a very short time but with the pyrometer 59 connected by a flexible wire 60 connected to a thermocouple 61 in the face of the type bed obviously it may swing back and forth with the travel of the type bed without breaking. The heat control on the side of the press and the manner in which it is connected to the heater mounted in the vibrating roller is clearly seen in the wiring diagram, Fig. 18. This thermometer 37 has no electrical connections of any kind.

Figure 12:
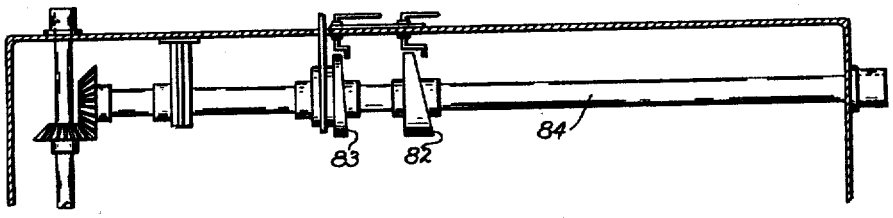
Fig. 12 is a fragmentary detailed view showing the mechanism used in order to reverse the direction of rotation of the ink roller and to change the timing of the ductor roller.
Figure 13:
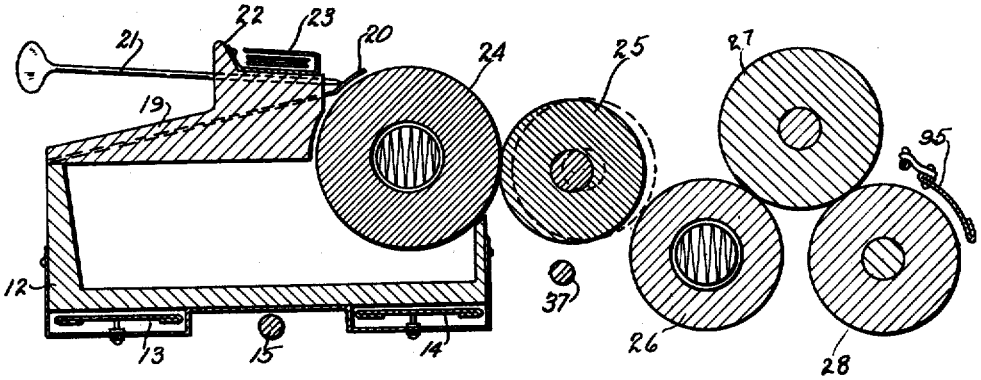
Fig. 13 is an enlarged cross section taken on the line X—X in Fig. 1, showing the ink fountain roller, ductor roller, vibrator roller, distributing roller and one of the form rollers, the agitating device being omitted from the ink fountain.
Figure 15:
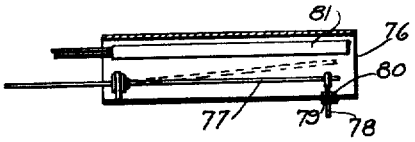
Fig. 15 is a detail view of the adjusting mechanism for changing the heat control.
Figure 14:
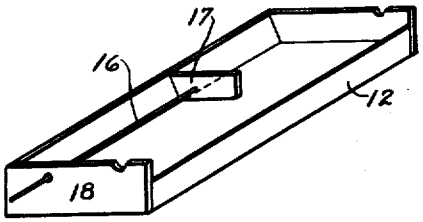
Fig. 14 is a detail view of the agitating device for the ink fountain.
Figure 17:
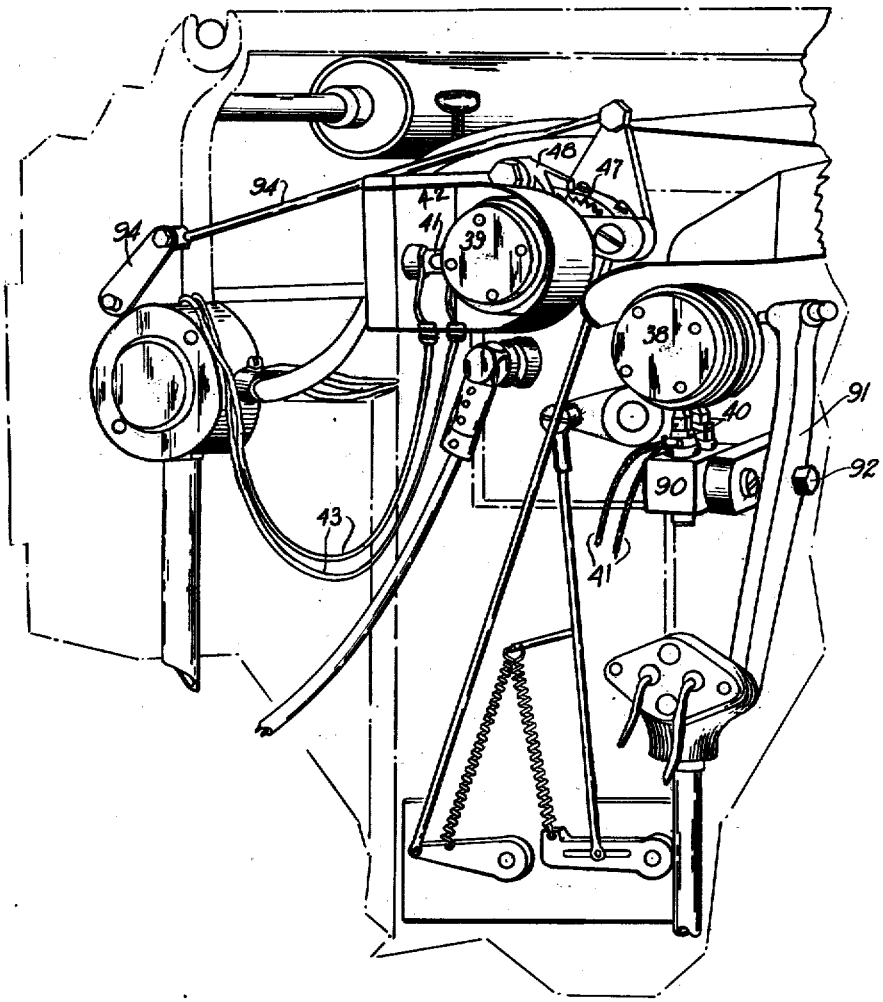
Fig. 17 is a fragmentary view of one side of the machine showing the collector rings for conveying current to the heating elements in the rotating rollers.
Figure 20:
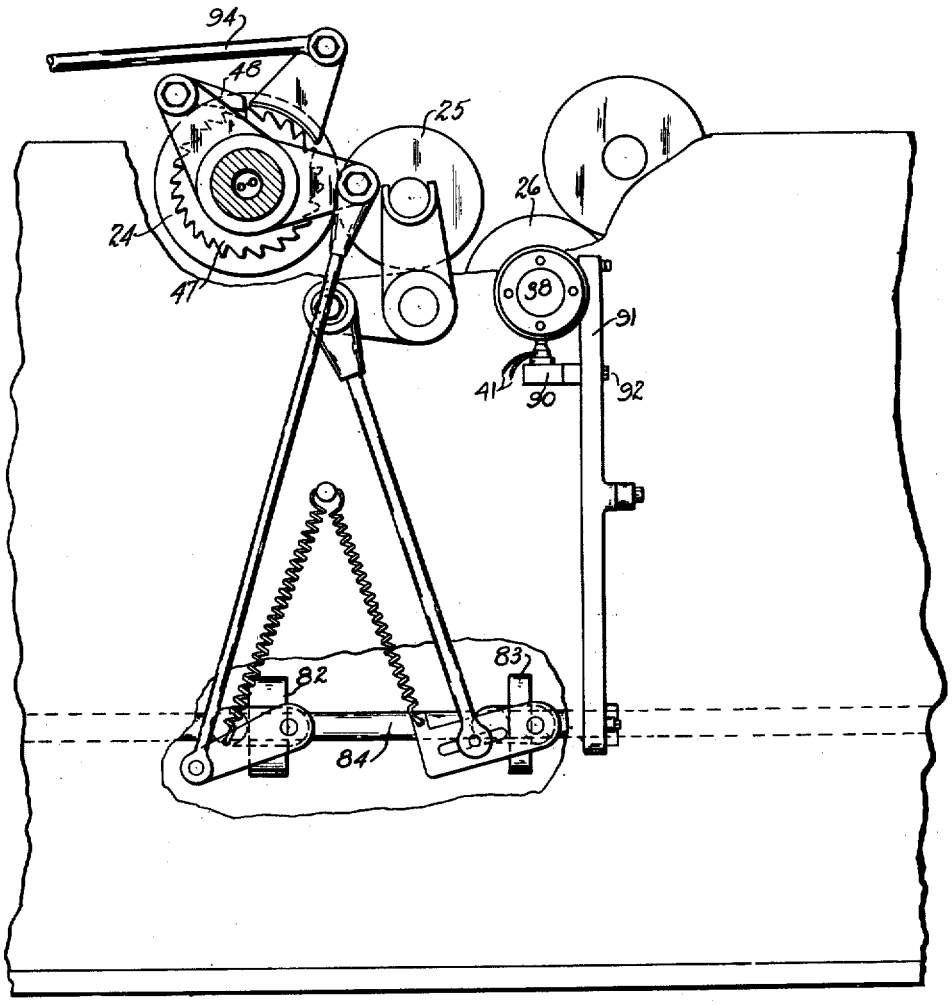
Fig. 20 is a fragmentary view showing the operating mechanism for rotating the ink fountain and for moving the ductor roller, the wiring being omitted for the sake of clearness.

We have not found it necessary to provide any heat control for the form rollers as we have found it is sufficient to control the heat only in the more vital points of the press but we provide a heating element 63 which can be adjusted towards or away from the face of the roller until located in the position to afford the requisite amount of heat required. On the switch board we provide pilot lights 64, 65 and 66. These lights are connected so that one side of the circuit is connected through the load circuit in the relay switch. The other side is connected directly to the bus line. The light 65 which is usually a green light indicates when the type bed circuit is closed. The light 64 which is usually a red light shows when the circuit leading to the fountain heating elements is closed and the other light 65 indicates when the vibrating roller circuit is closed. Single pole switches 67, 68, 69, 70 and 71 are provided in order to disconnect any circuit on the machine and leave the rest connected. This enables the operator to test the circuits working on any one part of the machine and will enable him to watch while the machine is in operation to see that everything is working properly. The relays do not control the heat. The thermometer bulb controls the heat. The main line switch 72 is provided to make or break the circuit leading to the electrical apparatus. Contacts 73, 74 and 75 close the circuit between the pyrometer and the relay switch which controls the type bed 1. The elements in the ink fountain are hooked in parallel to the circuit which leads through the feeder circuit back to the relay. They are all controlled by one bulb and one relay switch. In Fig. 15 we have shown means for adjusting the control for the heater in the vibrating roller. It is mounted in a casing 76 and comprises a controller bulb 77 formed by a cylindrical glass tube containing a liquid susceptible of quick response to heat variations the position of which can be varied by a screw 78 which is provided with a nut 79 on the outside and a nut 80 on the inside of the casing 76. We have found in practice that by moving this bulb towards or away from the heating element 81 which is connected in parallel with the heater in the vibrating roller that it will respond much more quickly than is possible where a thermocouple is employed being much more sensitive and avoiding the lag which is found where the thermocouple is utilized for this purpose. This in practice has been found to enable the operator to maintain the rollers at almost exactly uniform heat. In order to reverse the direction of rotation of the ink fountain roller so as to throw the wax up on itself instead of down into the machine, we have found it necessary to reverse the position of the cams 82 and 83 on the driving shaft 84 as clearly seen in Fig. 12. It is obvious that by reversing the positions of these cams that the direction of rotation of the ink fountain roller is changed, the pawl 48 being mounted on the opposite side of the ratchet wheel 47. It also operates to change the timing of the ductor roller by causing it to come in contact with the vibrator roller when running in the opposite direction from the standard press. Locating the pawl as shown in Fig. 20, also serves to turn the ink roller at a different time so that it may be rotating when the ductor roller touches it. The standard linkage 94 is provided to regulate the amount of rotation of the ink fountain roller. As shown in Fig. 20 the ink fountain roller 24 may be rotating at the time of contact with the ductor roller 25, this rotation being in such direction that the surface presented to the ductor roller is moving in a downward direction. When the ductor roller shifts to the position shown in dotted lines in Fig. 13, where it is in contact with the vibrator roller 26, the vibrator roller is rotating in such a direction that the surface presented to the ductor roller is moving in an upward direction.

Having described our invention what we regard as new and desire to secure by Letters Patent is:

1. In a printing press having an ink fountain, an ink fountain roller, a rotating vibrating roller, a ductor roller adapted to intermittently contact the ink fountain roller and the vibrator roller, form rollers, shafts for said rollers, and mechanism for operating the press; a friction gear on the shafts of the vibrator roller, ink fountain roller and ductor roller, means to intermittently rotate the ink fountain roller in such a direction that the surface presented to the ductor roller moves in a downward direction, means to actuate said first named means, whereby the ink fountain roller may be rotating when the ductor roller contacts the ink fountain roller, means for timing the contact of the ductor roller so that the surface of the vibrator roller presented to the ductor roller is moving in an upward direction at the time the ductor roller contacts the vibrator roller.

2. In a printing press having an ink fountain, an ink fountain roller, a rotating vibrating roller, a ductor roller adapted to intermittently contact the ink fountain roller and the vibrator roller, form rollers, shafts for said rollers, and mechanism for operating the press; a friction gear on the shafts of the vibrator roller, ink fountain roller and ductor roller, means to intermittently rotate the ink fountain roller in such a direction that the surface presented to the ductor roller moves in a downward direction, means to actuate said first named means, whereby the ink fountain roller may be rotating when the ductor roller contacts the ink fountain roller, means for timing the contact of the ductor roller so that the surface of the vibrator roller presented to the ductor roller is moving in an upward direction at the time the ductor roller contacts the vibrator roller, electrically operated means to heat said ink fountain roller and said vibrator roller, and means to maintain said heating means at a predetermined temperature.

3. In a printing press having an ink fountain, an ink fountain roller, a rotating vibrating roller, a ductor roller adapted to intermittently contact the ink fountain roller and the vibrator roller, form rollers, shafts for said rollers, and mechanism for operating the press; electric heating elements in said ink fountain and vibrator rollers, a collector ring on the shaft of each of said rollers, brushes for said collector rings, electrical conductors to lead electric current to said brushes, a rocker arm which reciprocates said vibrator roller, and a block secured thereto, the brushes for the collector ring of the vibrator shaft being mounted on said block.

4. In a printing press having an ink fountain, an ink fountain roller, a rotating vibrating roller, a ductor roller adapted to intermittently contact the ink fountain roller and the vibrator roller, form rollers, shafts for said rollers, and mechanism for operating the press; electric heating elements in said ink fountain and vibrator rollers, a collector ring on the shaft of the vibrator and ink fountain rollers, brushes for said collector rings, and electrical conductors to lead electrical current to said brushes.

5. In a printing press having an ink fountain, an ink fountain roller, a rotating vibrating roller, a ductor roller adapted to intermittently contact the ink fountain roller and the vibrator roller, form rollers, shafts for said rollers, and means to intermittently rotate the ink fountain roller in such a direction that the surface presented to the ductor roller moves in a downward direction, means to actuate said first named means, whereby the ink fountain roller may be rotating when the ductor roller contacts the ink fountain roller, means for timing the contact of the ductor roller so that the surface of the vibrator roller presented in the ductor roller is moving in an upward direction at the time the ductor roller contacts the vibrator roller.

6. In a printing press having an ink fountain, an ink fountain roller, a rotating vibrating roller, a ductor roller adapted to intermittently contact the ink fountain roller and the vibrator roller, form rollers, shafts for said rollers, and mechanism for operating the press; a cover for said ink fountain, an ink roller blade mounted therein, a plurality of closely spaced adjusting screws for said blade, an electric heating element mounted on the top of said cover and a plurality of electric heating elements secured to the bottom of said ink fountain.

7. In a printing press having an ink fountain, an ink fountain roller, a rotating vibrating roller, a ductor roller adapted to intermittently contact the ink fountain roller and the vibrator roller, form rollers, shafts for said rollers, and mechanism for operating the press; a cover for said ink fountain, an electric heating element mounted on the top of said cover, and a plurality of electric heating elements secured to the bottom of said ink fountain.

8. In a printing press having an ink fountain, an ink fountain roller, a rotating vibrating roller, a ductor roller adapted to intermittently contact the ink fountain roller and the vibrator roller, form rollers, shafts for said rollers, and mechanism for operating the press; a cover for said ink fountain, an electric heating element mounted on the top of said cover, a plurality of electric heating elements secured to the bottom of said ink fountain, and a liquid heat responsive element mounted intermediate the last named heating elements and connected to an electro-control device.

9. In a printing press having an ink fountain, an ink fountain roller, a rotating vibrating roller, a ductor roller adapted to intermittently contact the ink fountain roller and the vibrator roller, form rollers, shafts for said rollers, and mechanism for operating the press; a cover for said ink fountain, an electric heating element mounted on top of said cover, a plurality of electric heating elements secured to the bottom of said ink fountain, a manually operable agitating device in said fountain, and means to manipulate said device from the exterior of said fountain.

10. In a printing press having an ink fountain, an ink fountain roller, a rotating vibrating roller, a ductor roller adapted to intermittently contact the ink fountain roller and the vibrator roller, form rollers, shafts for said rollers, and mechanism for operating the press; electric heating elements in said ink fountain and vibrator roller, a collector ring on the shaft of each of said rollers, brushes for said collector rings, electrical conductors to lead electric current to said brushes, a rocker arm which reciprocates said vibrator roller, a block secured thereto, the brushes for the collector ring of the vibrator shaft being mounted on said block, a heat responsive element mounted below the ductor roller and between the ink fountain roller and the vibrator roller, said element being connected to an electric current control device.

11. In a printing press having an ink fountain, an ink fountain roller, a rotating vibrating roller, a ductor roller adapted to intermittently contact the ink fountain roller and the vibrator roller, form rollers, shafts for said rollers, and mechanism for operating the press; a reciprocating type bed having a plurality of ribs on one side, there being a plurality of spaced apertures in said ribs, a plurality of cylindrical sleeves detachably mounted therein, electric heating elements in said sleeves, a plurality of sliding contacts secured to said reciprocating type bed, brushes for said contacts, and electrical conductors to carry current to said brushes.

12. In a printing press having an ink fountain, an ink fountain roller, a rotating vibrating roller, a ductor roller adapted to intermittently contact the ink fountain roller and the vibrator roller, form rollers, shafts for said rollers, and mechanism for operating the press; a type bed having a plurality of ribs on its under side, there being a plurality of apertures in said ribs, a plurality of cylindrical sleeves detachably mounted in said apertures, electric heating elements mounted in said sleeves, an ink plate secured to and moving with said type bed, electric heating elements in said ink plate, a thermo-couple mounted in said type bed, and a flexible conductor connected to said thermo-couple.

13. In a printing press having an ink fountain, an ink fountain roller, a rotating vibrating roller, a ductor roller adapted to intermittently contact the ink fountain roller and the vibrator roller, form rollers, shafts for said rollers, and mechanism for operating the press; electric heating elements in said ink fountain and vibrator rollers, a collector ring on the shaft of each of said rollers, brushes for said collector rings, electrical conductors to lead electric current to said brushes, and an electric heating element mounted adjacent said form rollers.

14. In a printing press having an ink fountain, an ink fountain roller, a rotating vibrating roller, a ductor roller adapted to intermittently contact the ink fountain roller and the vibrator roller, form rollers, shafts for said rollers, and mechanism for operating the press; a type bed having a plurality of ribs on its under side, there being a plurality of apertures in said ribs, a plurality of cylindrical sleeves detachably mounted in said apertures, electric heating elements mounted in said sleeves, an ink plate secured to and moving with said type bed, electric heating elements in said ink plate, a thermocouple mounted in said type bed, a flexible electrical conductor connected to said thermo-couple, a drip pan below said ink plate, and gutters at each end of the ink plate which lead to said drip pan.

15. In a printing press having an ink fountain, an ink fountain roller, a rotating vibrator roller, a ductor roller adapted to intermittently contact the ink fountain roller and the vibrator roller, form rollers, shafts for said rollers, and mechanism for operating the press; a type bed having a plurality of ribs on its under side, there being a plurality of apertures in said ribs, a plurality of cylindrical sleeves detachably mounted in said apertures, electric heating elements mounted in said sleeves, an ink plate secured to and moving with said type bed, electric heating elements in said ink plate, a thermo-couple mounted in said type bed, a flexible electrical conductor connected to said thermo-couple, and means to prevent surplus carbon dropping on the operating mechanism of the press.

16. In a printing press having an ink fountain, an ink fountain roller, a rotating vibrator roller, a ductor roller adapted to intermittently contact the ink fountain roller and the vibrator roller, form rollers, shafts for said rollers, and mechanism for operating the press; a casing mounted below the ductor roller and between the ink fountain roller and the vibrator roller, an electro-heating element therein, a glass cylinder containing a liquid heat responsive element, terminating in a bulb mounted in said casing adjacent said element, an eye bolt supporting one end of said glass cylinder, and means to adjust the position of said eye bolt whereby the glass cylinder can be moved towards or away from said element.

17. In a printing press having an ink fountain, an ink fountain roller, a rotating vibrating roller, a ductor roller adapted to intermittently contact the ink fountain roller and the vibrator roller, form rollers, shafts for said rollers, and mechanism for operating the press; means to intermittently rotate the ink fountain roller in such a direction that the surface presented to the ductor roller moves in a downward direction, means to actuate said first named means, means for timing the contact of the ductor roller so that the surface of the vibrator roller presented to the ductor roller is moving in an upward direction at the time the ductor roller contacts the vibrator roller.

18. In a printing press having an ink fountain, an ink fountain roller, a rotating vibrating roller, a ductor roller adapted to intermittently contact the ink fountain roller and the vibrator roller, form rollers, shafts for said rollers, and mechanism for operating the press; means to intermittently rotate the ink fountain roller in such a direction that the surface presented to the ductor roller moves in a downward direction, means to actuate said first named means, means for timing the contact of the ductor roller so that the surface of the vibrator roller presented to the ductor roller is moving in an upward direction at the time the ductor roller contacts the vibrator roller, electrical operating means to heat said ink fountain roller and said vibrator roller, and means to maintain said heating means at a predetermined temperature.

19. In a printing press having an ink fountain, an ink fountain roller, a rotating vibrator roller, a ductor roller adapted to intermittently contact the ink fountain roller and the vibrator roller, a form roller, shafts for said rollers, means to intermittently rotate the ink fountain roller in such a direction that the surface adjacent to the ductor roller will move in a downward direction, and means to actuate said first named means; means for timing the contact of the ductor roller so that the surface of the vibrator roller presented to the ductor roller is moving in an upward direction at the time the ductor roller contacts the vibrator roller.

20. In a printing press having an ink fountain, an ink fountain roller, a rotating vibrating roller, a ductor roller adapted to intermittently contact the ink fountain roller and the vibrator roller, a form roller, shafts for said rollers, and mechanism for operating the press; a cover for said ink fountain, electric heating elements mounted adjacent said ink fountain to maintain the contents at the desired temperature, and a heat responsive element connected to an electro-control device.

21. In a printing press having an ink fountain, an ink fountain roller, a rotating vibrator roller, a ductor roller adapted to intermittently contact the ink fountain roller and the vibrator roller, form rollers, shafts for said rollers, and mechanism for operating the press; electrical heating means in said ink fountain roller and vibrating rollers, collector rings on the shafts of the vibrator and ink fountain rollers, brushes for said collector rings, and electric conductors to lead electric current to said brushes, electrically actuated adjustable means to control the heating element in said heating roller.

22. In a printing press having an ink fountain, an ink fountain roller, a rotating vibrating roller, a ductor roller adapted to intermittently contact the ink fountain roller and the vibrating roller, a form roller, shafts for said rollers, a casing mounted on the side of the press, an electric heating element therein, a cylinder containing a liquid heat responsive element terminating in a bulb, said heat responsive element being mounted in said casing adjacent said element, means to adjust the position of said cylinder so as to move it towards or away from said element, and mechanism for operating the press; electric heating elements in said vibrator roller, said heating elements being connected in parallel with the heating element in the casing on the side of the press.

23. In a printing press having an ink fountain, an ink fountain roller, a rotating vibrator roller, a ductor roller adapted to intermittently contact the ink fountain roller and the vibrator roller, a form roller, shafts for said rollers, and mechanism for operating the press; the combination of a casing with an electric heating element therein, a heat responsive element mounted in said casing adjacent said heating element and gradually adjustable towards or away from said heating element in order to adjust the sensitivity of the heat control, with an electric heating element in position to heat various parts of the press, said heating element being connected in parallel with the heating element in said casing, whereby the temperatures of said parts of the press are maintained and controlled.

24. In a printing press having an ink fountain, an ink fountain roller, a rotating vibrator roller, a ductor roller adapted to intermittently contact the ink fountain roller and the vibrator roller, a form roller, shafts for said rollers, and mechanism for operating the press; a casing with an electric heating element therein, a heat responsive element mounted in said casing adjacent said heating element and gradually adjustable towards or away from said heating element in order to adjust the sensitivity of the heat control, an electric heating element in the ink fountain roller, said heating element being connected in parallel with the heating element in said casing, whereby the temperature of said ink fountain roller is maintained and controlled.

25. In a printing press having an ink fountain, an ink fountain roller, a rotating vibrator roller, a ductor roller adapted to intermittently contact the ink fountain roller and the vibrator roller, a form roller, shafts for said rollers, and mechanism for operating the press, a casing with an electric heating element therein, a heat responsive element mounted in said casing adjacent said heating element and gradually adjustable towards or away from said heating element in order to adjust the sensitivity of the heat control, an electric heating element in the vibrator roller, said heating element being connected in parallel with the heating element in said casing, whereby the temperature of said vibrator roller is maintained and controlled.

GEORGE A. RUTKOSKIE.
NELSON S. WELK.